(12) United States Patent
Andreoli et al.

(10) Patent No.: US 7,647,212 B2
(45) Date of Patent: Jan. 12, 2010

(54) GRAPH-BASED NEGOTIATION SYSTEM WITH ENCAPSULATED CONSTRAINT SOLVER

(75) Inventors: Jean-Marc Andreoli, Meylan (FR); Stefania Castellani, Meylan (FR)

(73) Assignee: Palo Alto Research Center Incorporated, Palo Alto, CA (US)

( * ) Notice: Subject to any disclaimer, the term of this patent is extended or adjusted under 35 U.S.C. 154(b) by 486 days.

(21) Appl. No.: 10/855,515

(22) Filed: May 28, 2004

(65) Prior Publication Data

US 2005/0108036 A1 May 19, 2005

Related U.S. Application Data

(60) Provisional application No. 60/481,644, filed on Nov. 14, 2003.

(51) Int. Cl.
G06F 17/00 (2006.01)
(52) U.S. Cl. .................. 703/2; 706/11; 706/12
(58) Field of Classification Search .......... 705/1; 707/101; 706/11; 703/2
See application file for complete search history.

(56) References Cited

U.S. PATENT DOCUMENTS

| | | | |
|---|---|---|---|
| 4,907,274 A | 3/1990 | Nomura et al. | |
| 5,303,078 A | 4/1994 | Brackett et al. | |
| 5,586,021 A | 12/1996 | Fargher et al. | |
| 5,659,740 A | 8/1997 | Ezaki et al. | |
| 5,801,695 A | 9/1998 | Townshend | |
| 5,809,075 A | 9/1998 | Townshend | |
| 5,826,040 A | 10/1998 | Fargher et al. | |
| 5,826,239 A | 10/1998 | Du et al. | |
| 5,826,244 A | 10/1998 | Huberman | |
| 5,835,538 A | 11/1998 | Townshend | |
| 5,847,692 A | 12/1998 | Ono | |
| 5,859,872 A | 1/1999 | Townshend | |
| 5,924,082 A | 7/1999 | Silverman et al. | |
| 5,953,707 A | 9/1999 | Huang et al. | |
| 5,970,103 A | 10/1999 | Townshend | |
| 6,043,909 A | 3/2000 | Holub | |
| 6,088,659 A | 7/2000 | Kelley et al. | |
| 6,112,189 A | 8/2000 | Rickard et al. | |
| 6,128,773 A | 10/2000 | Snider | |
| 6,151,582 A | 11/2000 | Huang et al. | |
| 6,157,735 A | 12/2000 | Holub | |
| 6,182,055 B1 | 1/2001 | Kase et al. | |
| 6,195,794 B1 * | 2/2001 | Buxton ...................... 717/108 |
| 6,233,275 B1 | 5/2001 | Townshend | |
| 6,233,284 B1 | 5/2001 | Townshend | |
| 6,246,975 B1 | 6/2001 | Rivonelli et al. | |
| 6,321,133 B1 | 11/2001 | Smirnov et al. | |
| 6,400,770 B1 | 6/2002 | Townshend | |

(Continued)

OTHER PUBLICATIONS

Andreoli, Jean-Marc et al., "AllianceNet: Information Sharing, Negotiation and Decision-Making for Distributed Organizations", in Proc. of EC-Web 2000, London, U.K., 2000.

(Continued)

*Primary Examiner*—Evens J Augustin
(74) *Attorney, Agent, or Firm*—Fay Sharpe LLP

(57) ABSTRACT

A constraint solver is encapsulated in a service adapted to participate in a negotiation. In operation, the system constructs a graph in its memory for negotiating a set of actions to be performed by selected ones of a plurality of participants. Each node of the graph defines a negotiation context that has associated therewith a constraint store with at least a set of domain constraints stored therein that limit during the negotiation a set of semantic constraints of the service on variables of the constraint solver.

16 Claims, 9 Drawing Sheets

U.S. PATENT DOCUMENTS

| | | | |
|---|---|---|---|
| 6,459,425 B1 | 10/2002 | Holub et al. | |
| 6,594,773 B1* | 7/2003 | Lisitsa et al. | 713/600 |
| 6,690,749 B2 | 2/2004 | Townshend | |
| 6,750,992 B1 | 6/2004 | Holub | |
| 6,792,615 B1* | 9/2004 | Rowe et al. | 725/37 |
| 6,801,937 B1 | 10/2004 | Novaes et al. | |
| 6,823,068 B1 | 11/2004 | Samid | |
| 6,842,899 B2* | 1/2005 | Moody et al. | 718/100 |
| 6,859,927 B2 | 2/2005 | Moody et al. | |
| 6,882,988 B2 | 4/2005 | Subbu et al. | |
| 6,934,684 B2 | 8/2005 | Alpdemir et al. | |
| 6,961,943 B2 | 11/2005 | Miller et al. | |
| 6,978,244 B2 | 12/2005 | Rovinelli et al. | |
| 6,985,722 B1 | 1/2006 | Snelgrove et al. | |
| 6,995,870 B2 | 2/2006 | Holub | |
| 6,996,843 B1 | 2/2006 | Moran | |
| 7,016,882 B2 | 3/2006 | Afeyan et al. | |
| 7,024,399 B2 | 4/2006 | Sumner et al. | |
| 7,024,589 B2 | 4/2006 | Hartman et al. | |
| 7,065,588 B2 | 6/2006 | Konda et al. | |
| 7,075,643 B2 | 7/2006 | Holub | |
| 7,085,329 B2 | 8/2006 | Townshend | |
| 7,089,534 B2 | 8/2006 | Hartman et al. | |
| 7,107,253 B1 | 9/2006 | Sumner et al. | |
| 7,120,646 B2 | 10/2006 | Streepy, Jr. et al. | |
| 7,170,993 B2 | 1/2007 | Anderson et al. | |
| 7,206,805 B1 | 4/2007 | McLaughlin, Jr. et al. | |
| 7,277,874 B2 | 10/2007 | Sumner et al. | |
| 7,290,056 B1 | 10/2007 | McLaughlin, Jr. et al. | |
| 7,312,897 B2 | 12/2007 | Holub | |
| 2002/0052824 A1* | 5/2002 | Mahanti et al. | 705/37 |
| 2002/0111922 A1* | 8/2002 | Young et al. | 705/80 |
| 2002/0116349 A1* | 8/2002 | Batachia et al. | 706/11 |
| 2002/0147726 A1* | 10/2002 | Yehia et al. | 707/101 |
| 2003/0069736 A1* | 4/2003 | Koubenski et al. | 705/1 |
| 2003/0069737 A1* | 4/2003 | Koubenski et al. | 705/1 |
| 2004/0034848 A1* | 2/2004 | Moore et al. | 717/117 |
| 2004/0083186 A1 | 4/2004 | Andréoli et al. | 705/80 |
| 2004/0083187 A1 | 4/2004 | Castellani et al. | 705/80 |
| 2005/0027495 A1* | 2/2005 | Matichuk | 703/2 |

OTHER PUBLICATIONS

Andreoli, Jean-Marc et al., "Augmenting Offices with Ubiquitous sensing", in Proc. of Smart Object Conference, Grenoble, 2003.

Andreoli, Jean-Marc et al., "Negotiation as a Generic Component Primitive", in Proc. of Distributed Application and Interoperable Systems, Paris, France, 2003.

Andreoli, Jean-Marc et al., "Ubiquitous negotiation games: a case study", in Proc. of DEXA "e-negotiations" Workshop, Prague, Czech Republic, 2003.

Bichler, M., et al., "Towards a Structured Design of Electronic Negotiations", in Group Decision and Negotiation Journal, 12(4):311-335, 2003 (earlier version InterNeg Research Papers INR Jul. 2002).

Castellani, S., et al., "E-Alliance: A Negotiation Infrastructure for Virtual Alliances" in Group Decision and Negotiation Journal, 12(2):127-141, 2003.

Chen, Y., "Arc Consistency Revisited", in Information Processing Letters, 70:175-184, 1999.

Jung et al., "Argumentation as distributed constraint satisfaction: applications and results", published in Proceedings of International Conference on Autonomous Agents, pp. 324-331, Montreal, QB, Canada, 2001.

Mackworth, A, "Constraint Satisfaction", in Shapiro, S.(Eds.), Encyclopedia of Artificial Intelligence (2nd ed.), John Wiley and Sons, (pp. 285-293), 1992.

Montanari, U, "Networks of Constraints: Fundamental Properties and Applications to Picture Processing", in Information Science, 7, pp. 95-132, 1974.

Nelson, G. et al., "Simplification by Cooperating Decision Procedures", in ACM Transactions on Programming Languages and Systems, 1(2):245-257, 1979.

Shostak, R., "A Practical Decision Procedure for Arithmetic with Function Symbols", in Journal of the ACM, 26(2):351-360, 1979.

Sierra et al., "A framework for argumentation-based negotiation", published in Singh et al., editors, Intelligent Agents IV: Agent Theories, Architectures, and Languages, vol. 1365 of Lecture Notes in Computer Science, pp. 177-192. Springer Verlag, 1998.

Yokoo, M. et al., "Algorithms for Distributed Constraint Satisfaction: A Review", in Autonomous Agents and Multi-Agent Systems, 3(2):185-207, 2000.

Agha, G. et al., "A Foundation for Actor Computation", in Journal of Functional Programming, 7(1):1-72, 1997.

Aksit, M. et al., "Abstracting object interactions using composition filters", in R. Gerraoui, O. Nierstrasz, and M. Riveille, editors, Object Based Distributed Processing. Springer Verlag, 1994.

Andreoli, Jean-Marc et al., "CLF/Mekano: a Framework for Building Virtual-Enterprise Applications," in Proceedings of EDOC '099, Manheim, Germany, 1999.

Andreoli, Jean-Marc et al., "Towards a Flexible Middleware Negotiation Facility for Distributed Components", in Proceedings of DEXA "E-Negotiations" workshop, Munich, Sep. 5, 2001.

Andreoli, Jean-Marc et al., "Multiparty Negotiation for Dynamic Distributed Components", in Journal of Science of Computer Programming, 31(2-3):179-203, 1998.

C. Berge, "Graphs and hypergraphs", in North-Holland Publishing Company, Amsterdam, Inc., 1973, Chapter 17, pp. 389-413.

W. Emmerich, "Software Engineering and Middleware: A Roadmap", in Proceedings of ICSE 2000, the future of Software Engineering, Munich, Germany, 2000.

J.-Y. Girard, "Linear Logic", in Theoretical Computer Science, 50:1-102, 1987.

McConnell, Stephen et al., "Negotiation Facility," OMG final revised submission for a CORBA service, 1999.

Yellin et al., "Protocol specifications and component adaptors", in ACM Transactions on Programming Languages and Systems, 19(2): 292-333, 1997.

Managing intellectual property rights in the WWW: patterns and semantics Gil, R.; Tous, R.; Delgado, J.; Automated Production of Cross Media Content for Multi-Channel Distribution, 2005. AXMEDIS 2005. First International Conference on Nov. 30-Dec. 2, 2005, p. 8 pp. Digital Object Identifier 10.1109/AXMEDIS.2005.30.

Environmental Conflict Resolution Using the Graph Model, Hipel, KW. et al., Systems, Man and Cybernetics, 1993; "Systems Engineering in the Service of Humans", Conference Proceedings, International Conference on Oct. 17-20, 1993, pp. 153-158, vol. 1, Digital Object Identifier 10.1109/ICSMC.1993.384737.

Bratu, Mihnea, et al., A Software Infrastructure for Negotiation within Inter-organisational Alliances, J.Padget, et al. (Eds.): AMEC 2002, LNAI 2531, pp. 161-179, 2002. Springer-Verlag Berlin Heidelberg 2002.

* cited by examiner

| CONSTRAINT SOLVER ELEMENTS: | DESCRIPTION: | EXAMPLE: |
|---|---|---|
| ASPECT-VARIABLE MAPPING: | A STATIC MAPPING THAT MAPS ASPECTS OF SERVICE PARAMETERS TO VARIABLES OF CONSTRAINT SOLVER | job.size ↔ s<br>job.size1 ↔ s1<br>job.size2 ↔ s2 |
| BI-DIRECTIONAL TRANSLATION: | A STATIC TRANSLATION BETWEEN CONSTRAINTS IMPOSED BY NEGOTIATION STATEMENTS ON SERVICE PARAMETERS AND UNARY CONSTRAINT VARIABLES | $\leq 50 \leftrightarrow$<br>$\in \{0\ldots 50\}$ |
| SEMANTIC CONSTRAINTS: | AN INITIAL STATIC SET OF CONSTRAINTS THAT CHARACTERIZE THE SERVICE | job.size = job1.size + job2.size<br>$\Rightarrow$<br>s = s1 + s2 |
| DOMAIN CONSTRAINTS: | A DYNAMIC SET OF SOLVER CONSTRAINTS DEFINED DURING A NEGOTIATION THAT FURTHER LIMIT SEMANTIC CONSTRAINTS | $s1 \in \{15\ldots 50\}$<br>$s2 \in \{0\ldots 35\}$ |

| | |
|---|---|
| $A_0$:outsrc.Request(n,job.size) | Decision ($A_0$) |
| $A_0$:outsrc→C:coord.Request(n,J.size) | Synchronization |
| C:coord→$A_0$:split.Request(n,job.size) | |
| $A_0$:split.Request(n,{job.size,job1.size,job2.size}) | Decision ($A_0$) |
| $A_0$:split→C:coord.Request(n,{J.size,J1.size,J2.size}) | Synchronization |
| C:coord→$A_0$:outsrc.Request(n,job.size) | |
| C:coord→$A_1$:insrc.Request(n,job.size) | |
| C:coord→$A_2$:insrc.Request(n,job.size) | |
| $A_1$:insrc.Request(n,job.size) | Decision ($A_1$) |
| $A_1$:insrc→C:coord.Request(n,J1.size) | Synchronization |
| C:coord→$A_0$:split.Request(n,job1.size) | |
| $A_2$:insrc.Request(n,job.size) | Decision ($A_2$) |
| $A_2$:insrc→C:coord.Request(n,J2.size) | Synchronization |
| C:coord→$A_0$:split.Request(n,job2.size) | |

*FIG. 6*

GRAPH-BASED NEGOTIATION SYSTEM WITH ENCAPSULATED CONSTRAINT SOLVER

CROSS REFERENCE TO RELATED APPLICATIONS

Priority is claimed from U.S. Provisional Application No. 60/481,644, filed Nov. 14, 2003, entitled "Graph-Based Negotiation System With Encapsulated Constraint Solver", by the same inventors and assignee, which is hereby incorporated herein by reference. In addition, cross-reference is made to U.S. patent application Ser. No. 10/065,491 entitled "System For Negotiation Using Graphs", by Stefania Castellani et al. and U.S. patent application Ser. No. 10/065,492 entitled "System For Negotiation With Mirroring", by Jean-Marc Andreoli et al., which are assigned to the same assignee as the present invention and incorporated herein by reference.

BACKGROUND AND SUMMARY

The present invention relates generally to a method and apparatus for carrying out a negotiation using graphs, and more particularly, a method for encapsulating a constraint solver in the negotiation system.

Generally, negotiation has been used for the coordination of autonomous components in distributed applications. A negotiation may be defined as a transaction involving several components, the goal of which is to have the distributed components: (i) agree on a set of actions to be executed by each of them (i.e., reach a consensus on negotiated issues); and (ii) execute the set of actions in an atomic way. There exist different generic models that specify and organize the interactions among the components involved in a negotiation process (e.g., contract nets, auctions with their many variants, bi-lateral negotiations, etc.).

There also exist different mechanisms which address the issue of making informed decisions relevant to a negotiation from the point of view of the individual components that participate in a negotiation. The purpose of these decisions is primarily to make sure that the negotiation remains within the limits of a space of "authorized" solutions (the exact meaning of which is determined by the component making the decisions), and possibly also to orient the negotiation, within that space, towards some "optimal" solutions (again, in the sense of the component making the decisions).

Constraint solvers have been used to delimit the space of solutions authorized by a component in a negotiation. Generally, constraint may be used to express problems in a declarative way. Constraint solvers are generic tools capable of detecting constraint violations, but also inferring new constraints from existing ones. In particular, finite-domain constraints have been used in "constraint logic programming" research, and have also led to commercial implementations such as ILOG and Cosytech.

In addition, mechanisms for performing finite domain constraint solving have been investigated in the field of artificial intelligence (see for example publications, incorporated herein by reference, by: Montanari, entitled "Networks of constraints: Fundamental properties and applications to picture processing", published in Information Science, volume 7, pages 95-132 1974; and Mackworth, entitled "Constraint satisfaction" published in S. Shapiro, editor, Encyclopedia of Artificial Intelligence, pages 285-293, John Wiley & Sons, 1992).

Path-consistency techniques (used for finite domain constraint solving) and in particular arc-consistency techniques (where paths are only considered at length one), have been optimized in many ways (see for example the publication, incorporated herein by reference, by Chen, "Arc consistency revisited", published in Information Processing Letters, 70:175-184, 1999). Distributed versions of such consistency techniques, for so-called Distributed Constraint Satisfaction Problems (DCSP), have also been developed. In a DCSP, the variables and constraints are distributed among multiple agents, which then have to cooperate to find solutions (see for example the publication, incorporated herein by reference, by Yokoo et al., entitled "Algorithms for distributed constraint satisfaction: A review", published in Autonomous Agents and Multi-Agent Systems, 3(2): 185-207, 2000).

More generally, the cooperation between multiple, possibly heterogeneous, constraint solvers has also been investigated (see for example the publication, incorporated herein by reference, by Nelson et al., "Simplification by cooperating decision procedures", published in ACM Transactions on Programming Languages and Systems, 1(2):245-257, 1979, and the publication, incorporated herein by reference, by Shostak "A practical decision procedure for arithmetic with function symbols", published in Journal of the ACM, 26(2): 351-360, 1979).

The basis for the cooperation between constraint solvers generally involves exchanging information linked to shared variables. This mechanism has been generalized and incorporated into generic agent argumentation systems typically for distributed problem solving (see for example the publications, incorporated herein by reference, by: Jung et al., "Argumentation as distributed constraint satisfaction: applications and results", published in Proceedings of International Conference on Autonomous Agents, pages 324-331, Montreal, QB, Canada, 2001; and Sierra et al., "A framework for argumentation-based negotiation", published in Singh et al., editors, Intelligent Agents IV: Agent Theories, Architectures, and Languages, volume 1365 of Lecture Notes in Computer Science, pages 177-192. Springer Verlag, 1998).

While constraint solvers are useful, generic tools capable of automating some of the processes taking place in negotiation based applications, their integration in such applications requires some form of encapsulation to turn them into effective negotiators capable of fully taking part in a negotiation process. Constraint solvers have been used to delimit the space of solutions by a component in a negotiation in a prescriptive way by specifying the situations which are not authorized (i.e., those which violate some of the constraints).

Accordingly, it would be desirable to provide a method, and system therefor, for encapsulating arbitrary constraint solvers in negotiation processes that may possibly involve other components which may or may not be constraint aware. Such a method would advantageously involve other components in a negotiation process which are also capable of making negotiation decisions but are not necessarily constraint solvers themselves, nor even constraint aware (e.g., user interfaces for capturing human decisions, ad-hoc components for computing bids in an auction context, data repositories, activity managers, etc.).

In accordance with the embodiments disclosed herein there is provided a method, system and article of manufacture therefor, for encapsulating constraint solvers in graph-based negotiation processes. The method generalizes the constraint propagation mechanism itself, which represents argumentation, and the non-deterministic exploration of alternatives which usually complements constraint propagation in problem solving. This allows the coordination of constraint solvers with other components which may not be constraint solvers at all, nor even constraint aware, and are capable of making non-deterministic (i.e., automatic or human controlled) decisions and sharing them with the participants concerned in the negotiation.

In accordance with one aspect of the embodiments disclosed herein, a class of components is capable of taking part in coordinated negotiations in which graphs are constructed to carry out the negotiations. Decision-makers of the class of components are automated, and their role is to ensure that constraints, normally set by a coordinator of a negotiation, are respected throughout the execution of the negotiation process. The class of components is derived from constraint solvers working by propagation on finite domains. Advantageously, the class of components is adapted to prevent negotiations taking inconsistent paths as well as expose all consequences that may be inferred from each negotiation decision.

In accordance with another aspect of the embodiments disclosed herein, there is provided a system having a processor for carrying out a negotiation concerning a set of actions to be performed by selected ones of a plurality of participants. The system, method and article of manufacture therefor, carry out the negotiation with at least one of the plurality of participants encapsulating a constraint solver in a service. The method defines processing instructions in a memory of the system for carrying out the negotiation using the service encapsulating the constraint solver, and executes the processing instructions with the processor. The processor in executing the processing instructions for carrying out the negotiation with the service encapsulating the constraint solver: (A) establishing encapsulation input in the memory: (a) a mapping between aspects of parameters of the service and corresponding variables of the constraint solver, (b) a translation between negotiation statements on the aspects of the parameters of the service and domain constraints imposed on the corresponding variables of the constraint solver, and (c) a set of semantic constraints of the service on variables of the constraint solver; (B) constructing a graph in the memory for negotiating the set of actions to be performed; each node of the graph defining a negotiation context that has associated therewith a constraint store with at least a set of domain constraints stored therein; (C) propagating constraints defined by the set of semantic constraints and the set of domain constraints associated with nodes of the graph to other participants in the negotiation as domain constraints augment (i.e., further limit the solution space of) the set of semantic constraints during the negotiation.

BRIEF DESCRIPTION OF DRAWINGS

These and other aspects of the invention will become apparent from the following description read in conjunction with the accompanying drawings wherein the same reference numerals have been applied to like parts and in which:

FIG. 2 sets forth a detailed description of elements making up the constraint solver shown in FIG. 1 as well as an example for each element;

FIG. 6 illustrates synchronization by a coordinator of a negotiation with the negotiation graphs of three participants;

DETAILED DESCRIPTION

A. Negotiation Framework

Figure 1:
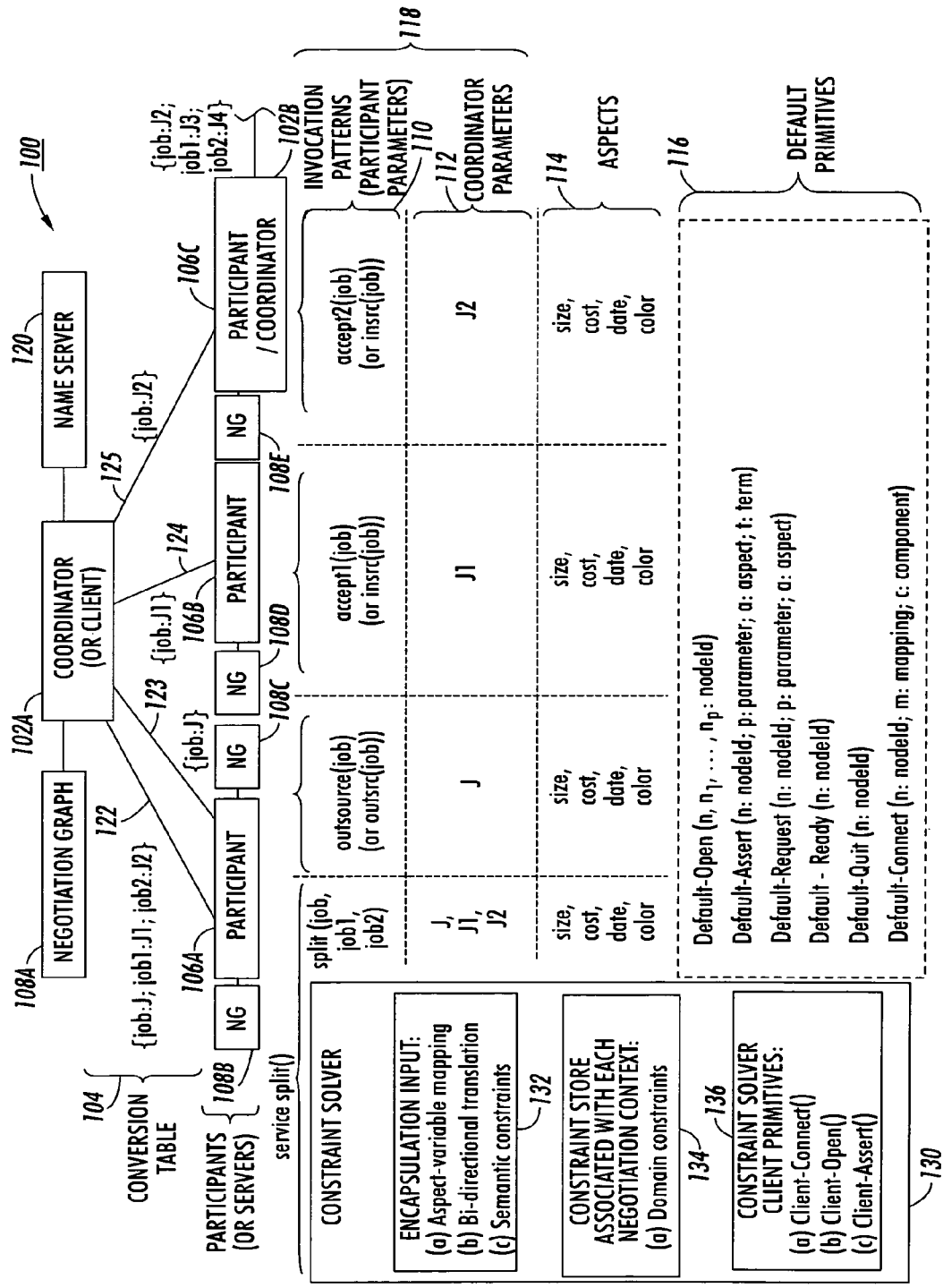
FIG. 1 illustrates a negotiation framework of a system in which a constraint solver is encapsulated.

FIG. 1 illustrates a negotiation framework of a system 100 in which a constraint solver 130 is encapsulated. Once the constraint solver 130 is encapsulated, it may act as a decision-maker in a negotiation carried out in the negotiation framework. The negotiation framework shown in FIG. 1 is described in detail in U.S. patent application Ser. Nos. 10/065,491 and 10/065,492, which are incorporated herein in their entirety by reference and referred hereinafter to as the "Xplore" negotiation framework. Although some terminology herein may differ from terminology used in the Xplore negotiation framework, the change in terminology is not intended to change the meaning or operability of the corresponding elements.

The Xplore negotiation framework relies on two features to constrain a negotiation: (i) an incremental feature (i.e., convergence towards a consensus is obtained by incremental steps by each participant), and (ii) a non-deterministic feature (i.e., participants may explore alternatives at decision points). It is modeled as a collaborative process among autonomous decision-making components, possibly distributed and with different goals and resources, towards the definition of an agreement as to a set of actions to be executed by each of them. Once an agreement is reached, the corresponding actions become part of transactions that are executed by the components.

Thus generally, the kind of items (e.g., print job) and the kind of aspects of those items (e.g., price and size) that are negotiated by participants in a negotiation is independent of the method and apparatus described herein for encapsulating a constraint solver in a negotiation framework in which the aspects of the items may be negotiated concurrently by multiple participants. In addition, participants in a negotiation may be homogeneous participants or alternatively heterogeneous participants that range from user interfaces that capture human decisions to automated components that implement various negotiation behaviors.

It will be appreciated that the Xplore negotiation framework is just one example of a negotiation framework in which constraint solvers may be encapsulated and that alternatives exist. In addition, it will be appreciated that the negotiation framework is not limited to the specific applications or domains of negotiation described herein but may be generally applicable to any domain in which a constraint solver may be used to automate (in whole or in part) negotiations among multiple software components.

Referring again to FIG. 1, the negotiation framework of the system 100 includes a set of two or more participants 106 and a set of one or more coordinators 102. The example shown in FIG. 1 illustrates three participants 106A, 106B, and 106C and two coordinators 102A and 102B. The participants 106 and coordinator(s) 102 are autonomous programs that may operate on one or more computational machines that are communicatively coupled using networks such as the Internet or an intranet.

A computational machine (i.e., system) includes negotiation processing instructions for performing a negotiation in accordance with embodiments of the invention. Each computation machine may involve one or more processing systems including, but not limited to, CPU (i.e., central processing unit or simply processor), memory/storage devices, communication links, communication/transmitting devices, servers, I/O devices, or any subcomponents or individual parts of one or more processing systems, including software, firmware, hardware, or any combination or subcombination thereof.

Each coordinator 102 carries out a negotiation by communicating with a set of participants 106 using a conversion table 104 that provides a mapping between negotiation graphs 108. The coordinator 102A with participants 106A, 106B, and 106C defines a first neighborhood with negotiation graphs 108A, 108B, 108C, 108D, and 108E and the coordinator 102B with its participants (not shown) defines a second neighborhood with their negotiation graphs (not shown), where each neighborhood has at least two participants and at least one coordinator. In addition, each participant has one negotiation graph for each invocation pattern (or service) 110 that is invoked (i.e., for each instance of a service that is invoked there exists a negotiation graph for that instance).

For example, the participant 106A has two negotiation graphs 108B and 108C, corresponding to invocation patterns (or services) split( ) and outsource( ), respectively. During the negotiation, the participants 106 reach an agreement as to a set of actions to be performed by each of them. These actions are defined by their invocation patterns. Also in the example shown in FIG. 1, the coordinator 102A has a negotiation graph 108A that links with the four negotiation graphs 108B-108E through the four neighborhood links 122, 123, 124, and 125. Each neighborhood link 122-125 is labeled with a conversion table 104, (i.e., {job:J; job1:J1, job2:J2}, {job:J}, {job:J1}, {job:J2}, respectively).

Each invocation pattern 110 is an external description of what actions each participant can perform (i.e., an interface). An invocation pattern 110, however, does not constrain the implementation of actions that a participant may perform. Instead, an invocation pattern constrains the way such actions are made visible to other computational machines. That is, an invocation pattern is an external name for an ongoing internal action. More formally, an invocation pattern is a tuple consisting of an invocation name and a set of named parameters. Each tuple is an ordered collection of typed data objects or place holders, called elements.

Each participant parameter (e.g., J, J1, J2) of an invocation pattern 110 is attached a coordinator parameter 112 using the conversion table 104 (e.g., job, job1, job2). The coordinator parameters 112 define interdependencies between the plurality of participants that are shared across invocation patterns 110. Invocation patterns 110 with coordinator parameters 112 are referred to herein as an "invocation" or an "invoked service" 118. That is, invocations 118 are obtained by assigning coordinator parameters 112 to invocation patterns 110. Each coordinator parameter 112 has properties that describe aspects 114 of its value. Each aspect has a value or a constraint on a range of values.

The participants 106 carry out a negotiation by collaboratively building their respective negotiation graphs 108 using a protocol defined by a set of default primitives 116 that are instantiated by the invocation patterns 110. Each participant 106 in a negotiation only views its negotiation graph and acts upon it or has it acted upon through its set of default primitives 116 instantiated by its invocation pattern. The protocol is more fully defined in the Xplore negotiation framework.

The combination of invocations 118 of the participants 106 defines a negotiation problem statement to which a solution is negotiated using the coordinator 102. The role of the coordinator parameters in a negotiation problem statement is to capture interdependencies between the invocation patterns 110 to be realized through actions by each of the participants 106.

A.1 Components, Services, Instances

In sum, a negotiation in the Xplore negotiation framework is modeled as a collaborative process among autonomous decision making components (i.e., participants 106 and coordinators 102), possibly distributed and with different goals and resources, towards the definition of an agreement as to a set of actions to be executed by each of them. The ability of a component in the Xplore negotiation framework to negotiate is made visible to other components through a set of services (i.e., invocation patterns 110). Each service specifies a list of formal parameters. Each invocation of a service triggers the creation of a service instance (i.e., invocation 118), which is a conceptually shared space between the invoking and the invoked components. The invoked and the invoking components conduct a negotiation in the shared space about the service parameters in that invocation. Once an agreement is reached, the corresponding actions are transactionally executed by the components.

A.2 Negotiation State

The Xplore negotiation framework itself does not need to know anything about the meaning or encoding of names, aspects and terms: they are treated as atomic pieces of data (strings of bytes). Its role is to synchronize the knowledge captured by the negotiation graphs 108 of all the components. The Xplore negotiation framework sets forth a synchronization mechanism for graph manipulation by operating on an explicit representation of the negotiation graphs at the level of each component.

In the Xplore negotiation framework, the state of a negotiation is represented by a graph that logs the negotiation decisions and their dependencies. More specifically, each participant 106 in a negotiation represents the current and prior states of its involvement in the negotiation as a bi-colored, directed, acyclic graph. A negotiation graph may contain two types of nodes: white nodes, representing negotiation contexts storing knowledge about negotiated data-items relevant to a participant or coordinator, and black nodes, representing decision points with multiple alternatives. Each white node is decorated with specific information about the state of the negotiation at that node. A white node inherits the knowledge stored in its ancestor white nodes, thus capturing how the participants incrementally make their decisions. On the other hand, black nodes capture non-determinism, as they introduce explicit alternative branches in the negotiation.

More specifically, white nodes (or negotiation contexts) hold the knowledge about items being negotiated in the form of "negotiation statements" that are represented by triples p, a, and t, where "p" is the name of an item (or parameter), "a" is one of its aspects, and "t" is a term describing this aspect. In the specific example discussed in section C below, the items are print jobs that have several aspects such as price, size, and delivery date. An example negotiation statement may be informally written as job.size<=10, where job is the name given by a component to an item (a job), size is one of its aspects, and <=10 is a term that describes it.

A.3 Negotiation Process

A negotiation process in the Xplore negotiation framework is modeled as the collaborative construction of a negotiation graph by two service instances. Each service instance has its own partial copy of the graph, containing the appropriate view of the state of the negotiation according to its declared interests (i.e., the white nodes store only the knowledge about the negotiated items which are relevant to that participant). A service instance involved in a negotiation expresses negotiation decisions through manipulations of its own copy of the graph using default primitives 116 that follow the negotiation protocol defined in the Xplore negotiation framework. The behavior of each primitive is summarized in Table 1 together with their behavior which is referred to herein as the "default behavior" for the primitive.

TABLE 1

| PRIMITIVE | DEFAULT BEHAVIOR |
| --- | --- |
| Open(n, n1, . . . , $n_p$:nodeId): | Creates a new node n, which must not already exist, from nodes n1, . . . , $n_p$, which must already exist and be of the same color (n is then of the opposite color). If n is white then p must be 1, but otherwise it may be any positive number: thus decision points can depend on the fusion of multiple negotiation contexts. |
| Ready/Quit (n:nodeId): | Expresses the decision to stop the negotiation at node n (but not in siblings), either because the participant is satisfied with the state at that node and is ready to commit, or because the participant is dissatisfied with that state and wishes to leave the negotiation. Node n must exist and be white. |
| Assert (n:nodeId, p:name; a:aspect; t:term): | Expresses the decision that, in the negotiation context represented by node n in the graph (which must exist and be white), the value of the data-item named p must have the property expressed by term t pertaining to aspect a. |
| Request (n:nodeId; p:name; a:aspect): | Expresses that, to proceed with the negotiation, a component needs to obtain information, through assertions by other components, about aspect a of the data-item named p at node n (which must exist and be white). |
| Connect (n:nodeId; m:mapping; c:component): | Invites a component, through one of its services specified by c, to join the negotiation from node n onward. The mapping m specifies the translation table between the formal parameters of c and (some of) the local names of data-items. |

The Open( ) and Assert( ) primitives allow an individual service instance to build a negotiation graph, by creating and populating context nodes with information about the negotiation state at these nodes. The other primitives handle the negotiation process itself and only concern themselves with the collaborative construction of the graph.

In the Xplore negotiation framework, the behavior of a service is a program that specifies what has to be done when an instance of that service receives a call to any of the primitives of the protocol. That call may come either from the invoker component, which created the instance, or from any of the instances of service invited by it (if any). There is an automatic reaction (forming part of the default behavior) which consists in actually updating the local copy of the graph as defined by the primitive which is called, and forwarding the call to all the other negotiations which are concerned (i.e., using a copycat strategy). Each primitive in Table 1 may have a service-specific behavior in addition to its default behavior (see for example client-assert( ) at 310 in FIG. 3 which invokes "Default-Assert( )" at 310(E) (or its default behavior) in addition to its other component-specific behavior 310(A)-310(D)). Thus, any specific behavior specified for a service is executed along with its default behavior that may consist of new calls to primitives of the protocol.

B. Constraint Solver As Negotiator

In accordance with one embodiment of the present invention and as shown in FIG. 1, a constraint solver 130 is encapsulated as a component in the Xplore negotiation framework to provide decision-making and synchronization capabilities when interoperating with other components of a negotiation that may or may not be constraint-based. The Xplore negotiation framework is generic therefore may be adapted to inter-operate with the decision-making capabilities specific to each component. In accordance with one aspect of the invention, there is provided encapsulation input 132 for encapsulating the constraint solver 130 in a service of the system 100. In accordance with another aspect of the invention, the constraint solver 130 defines a constraint store 134 that is associated with each node of the negotiation graph 108B that represents a negotiation context. In accordance with yet another aspect of the invention, the constraint solver 130 includes a set of client primitives 136 (i.e., with service-specific behavior) that are invoked by the client (or coordinator) 120A in addition to the corresponding default primitives 116 (or primitives' default behavior).

Generally, the constraint store 134 is a structure that captures the knowledge derived by the constraint solver about its variables. In finite domain constraint solvers, that knowledge usually consists of the initial constraint specification, augmented with an assignment, for each variable, of its current domain (i.e., the subset of its reference domain which is the complement of the set of "no-good" values determined by the constraint solver). In practice, many constraint solvers only store an upper approximation of this domain, for example, in the case of integer domains, an enclosing interval (so that only its bounds need to be stored).

More specifically, FIG. 2 sets forth a detailed description of elements making up the constraint solver 130 as well as an example for each element. The elements of encapsulation input 132(a)-132(c) consist of static data used for encapsulating the constraint solver in the service of the negotiation system, whereas the element of constraint store 134(a) consists of dynamic data forming part of the constraint store 134 associated with each negotiation context node in the negotiation graph of each instance of its corresponding service. Dynamic data may change while a negotiation takes place. More specifically, the element 132(a) is an aspect-variable mapping that maps aspects of service parameters to variables of the constraint solver; the element 132(b) is a bi-directional translation between constraints imposed by negotiation statements on service parameters and domain constraints; the elements 132(c) are semantic constraints that characterize the service; and the elements 134(a) are domain constraints that are defined during a negotiation that further augment semantic constraints 132(c) (i.e., the domain constraints further limit during the negotiation the solution space defined by the semantic constraints).

In one embodiment, the constraint solver 130 makes use of the class of constraint solvers that work by the propagation of unary (typically finite-domain) information on the constrained variables. In general, this class of constraint solvers handle constraint specifications consisting of a set of variables, a set of reference domains (finite sets), and a set of constraints (finite graphs over the reference domains). Each variable ranges over a given reference domain and the constraint solving process essentially consists of removing values from the domain of a variable (initially equal to its reference domain) whenever the constraint solver detects that such values cannot be part of any solution satisfying all the constraints. The method for encapsulating the constraint solver 130 in a service of the Xplore negotiation framework, is adapted to enable the encapsulation of any constraint solver of that class, without tampering with its internal constraint propagation mechanisms, thereby turning the constraint solver into a component capable of taking part in a negotiation within the framework.

Figure 3:
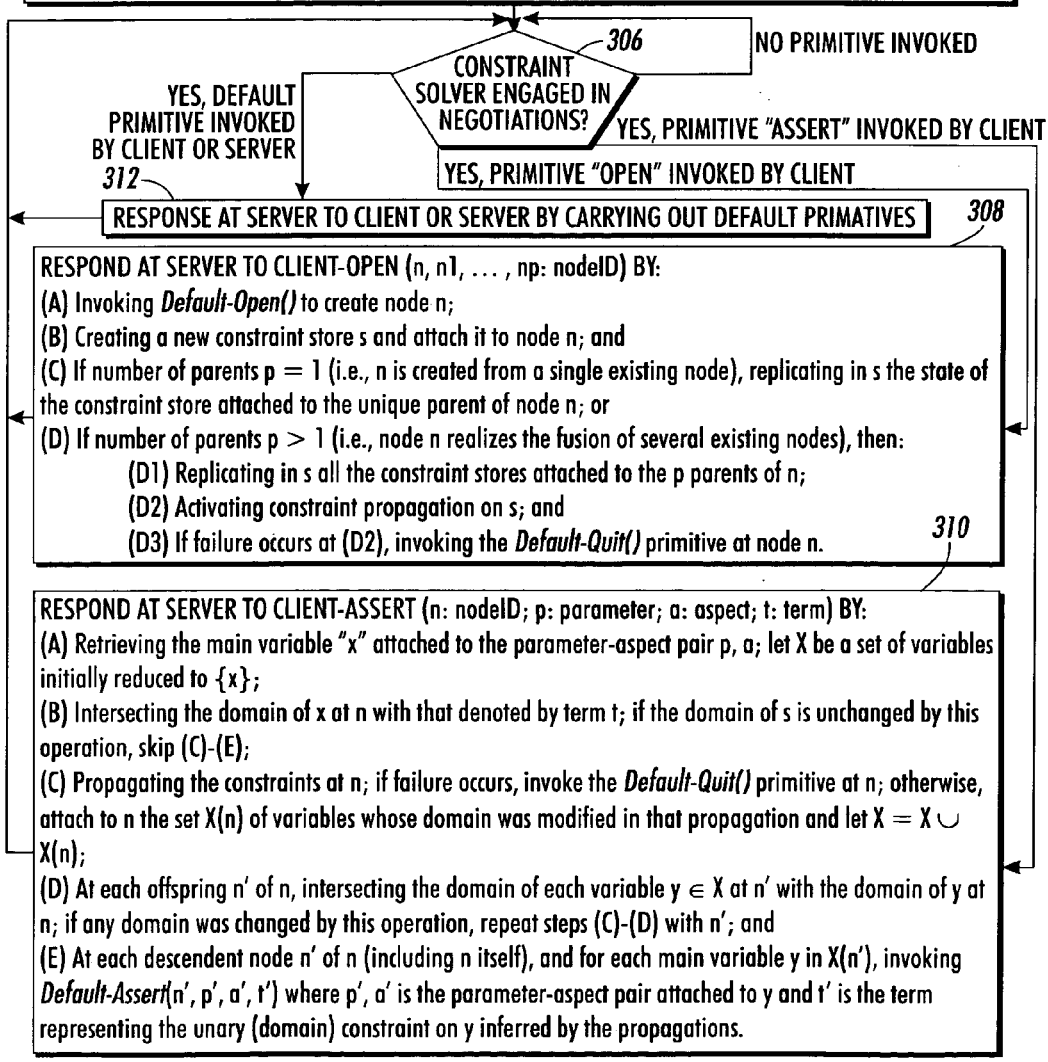
FIG. 3 is a flow diagram that sets forth configuration of the constraint solver in a service and operability within a negotiation.

FIG. 3 is a flow diagram that sets forth configuration of the constraint solver 130 in a service of the Xplore negotiation framework (detailed in Section B.1 below) and operability within a negotiation (detailed in Section B.2 below). Although FIG. 3 considers only a two-party negotiation, those skilled in the art will appreciate that this does not affect the generality of what follows, as there exist simple means, in the Xplore negotiation framework, to turn any multi-party negotiation into a set of inter-dependent two-party negotiations (orchestrated by a coordinator who has a neutral role and acts, with each participant, as a proxy for all the other participants; see the detailed example of Section C). More precisely, a two-party negotiation normally involves a service requester (client 102, usually a coordinator) and a service provider (server 106, usually a participant) that try to reach an agreement on the conditions of the service performance. Note that the roles of client and server differ only at the initialization and termination of a negotiation; during the negotiation proper, their roles are symmetric.

As an example, consider the service split(job,job1,job2) shown in FIG. 1 offered by a print shop component 106A, with three parameters job, job1, and job2, each of which denotes a print-job. The role of this service is to split the print job denoted by the first parameter (job) into two parts, which are also print jobs, denoted by the second and third parameters (job1 and job2). Splitting is useful, for example, when a job cannot be outsourced as a whole, and a decision is made to outsource it instead as multiple parts. Intuitively, the function of the service split( ) imposes one or more constraints between its three arguments. For example, the size of job may be constrained to be equal to the sum of the sizes of job1 and job2, which may informally be written as "job.size=job1.size+job2.size". Similarly other dependencies of the same kind may be defined for other characteristics of the job such as completion date and cost. Accordingly, the constraint solver 130 encapsulated in the service split( ) is used to carry out negotiations having such constraints.

B.1 Constraint Solver Configuration

Referring again to FIG. 3, a constraint solver is configured in a service of a component at 302 (as shown in FIG. 1 in the example service split( ) of print shop components). This configuration is detailed in steps 302(A)-302(C) in FIG. 3.

At 302(A), the server defines a mapping from the service parameters (and aspects) onto some of the internal variables of the constraint solver. These variables, which are the only variables to have dependencies outside the constraint solver, are defined herein as the main variables of the constraint solver; other variables of the constraint solver are defined herein as side variables. At 302(B) the server defines a bi-directional translation between negotiation statements on the service parameters and unary domain constraints on the corresponding main variables of the constraint solver. At 302(C), the server defines a set of constraints of arbitrary arity on the variables of the constraint solver, defining the semantics of the service (i.e., generally "arity" is the number of arguments a function or operator takes).

Thus, in the example of service split(job, job1, job2) shown in FIGS. 1 and 2, the relevant parameter-aspect pairs at 132(a) are job.size, job1.size, job2.size. These parameter-aspect pairs are mapped onto internal variables of the constraint solver (i.e., the constraint solver's main variables) s, s1, and s2, respectively. Also, semantic constraints on these parameter-aspect pairs are turned into nary constraints on the main variables (e.g., s=s1+s2). A negotiation statement that the size of job is lower than 50, which is informally written as job.size<=50, translates into the unary domain constraint s ∈ {0 . . . 50} on the main variable s attached to the parameter-aspect pair job.size. The translation defined at 132(b) works in both directions. It will be appreciated by those skilled in the art that some form of agreement is required between the components exchanging these statements as to the meaning and encoding of the terms and aspects they contain.

When the semantics of the service itself are translated into a set of constraints of arbitrary arity between the main variables of the constraint solver at 302(C) there exists the possibility of introducing some side variables in the constraint solver. Side variables represent existentially quantified variables in the constraints. They are often useful, for example, to turn inequation constraints of the form $x \leq y$ (if they are not handled directly by the constraint solver) into equations $x+z=y$ where z is a side variable meant to be positive. In the example above there is no need of side variables, the size constraint given for the split service translates into a linear arithmetic constraint (assuming the constraint solver supports such kind of constraints) of the simple form s=s1+s2 where job.size, job1.size and job2.size are mapped respectively onto the (main) variables s, s1, s2 of the constraint solver.

In its simplest form, the set of constraints defining the semantics of the service encapsulating the constraint solver 130 is assumed to be statically defined by this service. However, much of what is described herein applies almost directly to the case where the constraints are established dynamically while a negotiation is ongoing, either as the result of further knowledge being derived by the constraint solver, or by an explicit action of a human user, or possibly even as a result of learning from past service executions.

B.2 Constraint Solver In Operation

Once configured at 302 in FIG. 3, the first action of the server (or participant) is to respond to an engagement by the client (or coordinator) at 304. A client in the Xplore negotiation framework engages a server when the client invokes the Connect primitive, which is translated at the server into performing the Client-Connect primitive that involves performing steps 304(A)-304(D).

At 304(A), the server creates a constraint store, establishes in it all the variables (both main and side variables) of the constraint solver (e.g., s, s1, and s2), and installs all the semantic constraints of the service on these variables (e.g., s=s1+s2). At 304(B), the server propagates all the constraints in this constraint store using, for example, arc-consistency or path-consistency techniques. This operation should not result in failure, since it would mean the service has intrinsically failed even before starting any interaction with any other components. At 304(C) the server attaches this constraint store to the root node and invokes (i.e., calls), for each main variable, the Default-Request( ) primitive on the corresponding parameter-aspect pair at that root node. At 304(D), the server invokes the Default-Connect( ) primitive, to synchronize the negotiation graphs.

Once initialized at 304, the server then intercepts the invocations at 306 to the operations of the Xplore negotiation framework coming from the client and performs some constraint-specific processing for the open( ) primitive at 308 and the assert( ) primitive at 310 before executing the default behavior, as detailed below; otherwise, all other primitives are responded to at 312 by their default behavior described in the Xplore negotiation framework.

When a Client-Open(n, $n_1, \ldots, n_p$) is invoked by the client at 308 steps 308(A)-308(D) are performed. At 308(A), the server invokes the primitive Default-Open( ), which in part creates a new node n in the negotiation graph that represents a new negotiation context. At 308(B), the server creates a new constraint store s and attaches it to node n. If the number of parents p=1 (i.e., node n is created from a single existing node 308(C)), the server replicates in the new constraint store s the state of the constraint store attached to the unique parent of n. At 308(D) if the number of parents p>1 (i.e., node n realizes the fusion of several existing nodes), then the server performs steps 308(DI)-308(D3).

Finally at 308(D1), the server replicates in the constraint store s all the constraint stores attached to the p parents of node n. This step amounts to assigning to each variable the intersection of all the domains assigned to that variable in the parent nodes. At 308(D2) the server activates constraint propagation on the constraint store s (which may result in failure as the constraints in the parent stores may be separately consistent but altogether inconsistent). At 308(D3), if failure occurs at 308(D2), the server invokes the Default-Quit primitive at node n.

When a Client-Assert(n, p, a, t) is invoked by the client at 310, the server performs steps 310(A)-310(E). At 310(A), the server retrieves the main variable "x" attached to the parameter-aspect pair p, a; let "X" be a set of variables initially reduced to {x}. At 310(B), the server intersects the domain of x at n with that denoted by term t; if the domain of x is unchanged by this operation steps 310(C)-310(E) are skipped. At 310(C), the server propagates the constraints at node n, and if failure occurs, it invokes the Default-Quit( ) primitive at node n; otherwise, the server attaches to node n the set X(n) of variables whose domain was modified in that propagation and lets X=X ∪ X(n). At 310(D), the server intersects at each offspring node n' of node n, the domain of each variable y ∈ X at node n' with the domain of y at node n; if any domain was changed by this operation, steps 310(C)-310(D) are repeated with n'. At each descendent node n' of n (including n itself), and for each main variable y in X(n'), the server invokes at 310(E) the Default-Assert(n', p', a', t') primitive where p', a' is the parameter-aspect pair attached to y and t' is the term representing the unary (domain) constraint on y inferred by the propagations.

It will be appreciated that the invocation of the Default-Assert( ) primitive at step 310(E) does not cause steps 310 (A)-310(D) to repeat, as they originate from the server (they represent the decisions of the constraint solver) and not from the client. This holds similarly for the Default-Request( ) primitive invoked at step 304(C), the Default-Connect( ) primitive invoked at step 304(D), the Default-Open( ) primitive invoked at step 308(A), and the Default-Quit( ) primitive invoked at steps 308(D3) and 310(C).

B.3 Illustrative Example

Figure 4:
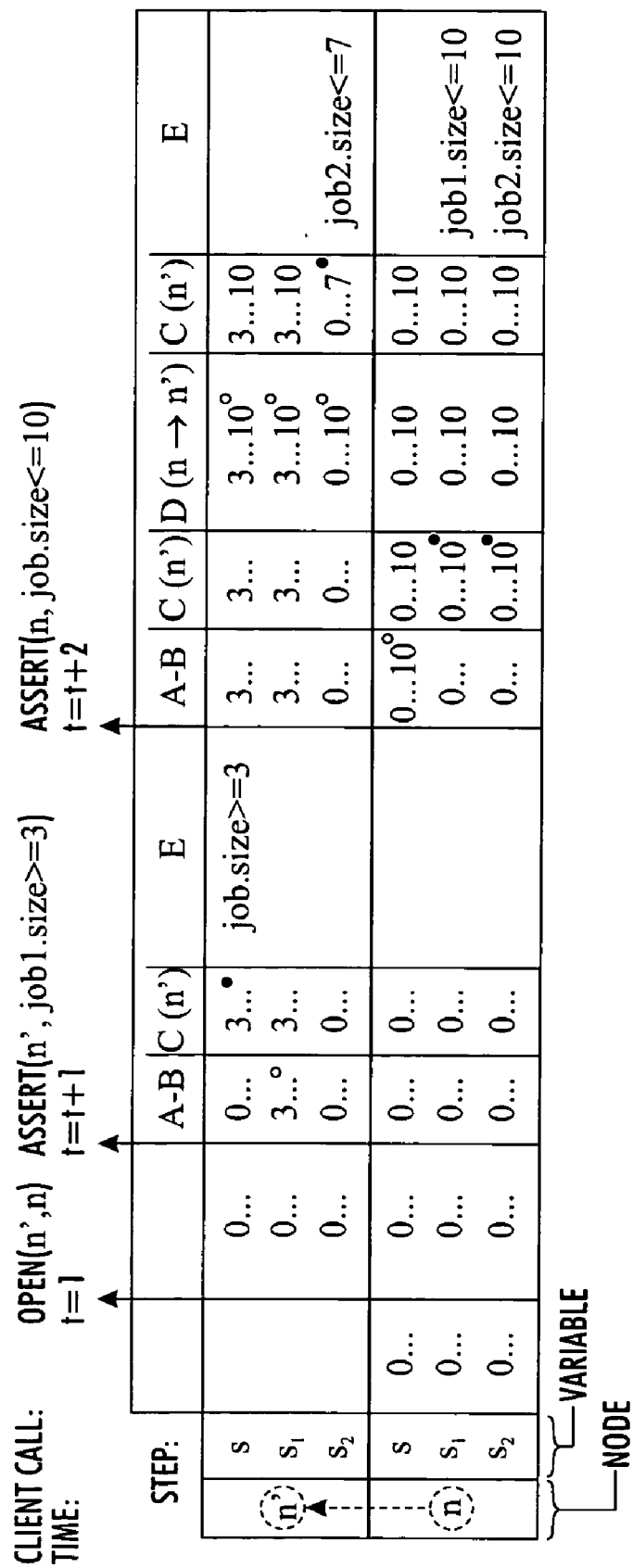
FIG. 4 presents a table that shows the evolution of the domains of the variables s, $s_1$, $s_2$, at nodes n and n' respectively for the two cases.

This section sets forth two example cases that make use of the split(job, job1, job2) service described above and shown in FIG. 1 to illustrate the method described in FIG. 3 (specifically steps A-E of the Client-Assert( ) primitive at 310). More specifically, FIG. 4 presents a table that shows the evolution of the domains of the variables s, $s_1$, $s_2$ (which are main variables), at nodes n and n' respectively (where n is the parent of n') for the two example cases. In these example cases, domains actually reduced by intersection at step 310 (B) or at step 310(D) are marked with "○", and domains modified by propagation at step 310(C) are marked with "●". Further to simplify these example cases, it is assumed that all the variables for both cases have the reference domain {0 . . . M}, where M is some sufficiently large number to be identified to infinity. It is also assumed that the constraint solver performs in both cases elementary arc-consistency propagations.

In the first case beginning at time t+1 (set forth in columns 5-7 of FIG. 4), job1.size>=3 is Asserted by a client at a node n' (set forth in row 2 of FIG. 4). Since the main variable $s_1$ is attached to the parameter-aspect pair job1.size and term >=3 translates into the unary constraint $s_1>3$, the domain of $s_1$ is reduced to {3 . . . } in the constraint store attached to n'. By simple arc-consistency on the constraint $s=s_1+s_2$, the propagation at step 310(B) reduces the domains of s to the same domain. Since s is the main variable attached to the parameter-aspect pair job.size, the change to the corresponding domain is turned into an Assert operation (see step 310(E)) job.size>=3.

In the second case beginning at time t+2 (set forth in columns 8-12 of FIG. 4), the node n', where job1.size>=3 has already been Asserted by the client, and, by propagation, job.size>=3 was Asserted by the server, has a direct ancestor node n, where job.size<=10 is now Asserted by the client. As before, at node n' the domains of s and $s_1$ are both reduced to {3 . . . }, while at node n their domains have not been reduced. When job.size<=10 is Asserted at node n, the same propagations as above happen, so that the domains of s, $s_1,s_2$ are reduced to {0 . . . 10} at n (step 310(C)). Furthermore, these domains are replicated in n' (step 310(D)), so that the domain of $s_1$ and s are now reduced to {3 . . . 10} at n' while that of $s_2$ is still reduced to {0 . . . 10}. Finally, by running the propagation at node n' again (step 310(C) in the second occurrence of the loop 310(C)-310(D)), the domain of $s_2$ is further reduced to {0 . . . 7}, again by arc-consistency on the constraint $s=s_1+s_2$. So, in addition to the Assert operations job1.size<=10 and job2.size<=10 at node n, the change on the domain of variable $s_2$ at node n' is turned into another Assert operation, job2.size<=7 at that node. This shows why it is important to repeat the propagation (step 310(C)) at each offspring (and, by iteration, each descendent) of n (loop 310 (C)-310(D)).

B.4 Variants And Extensions

It will be appreciated by those skilled in the art that there exists different ways the method set forth in FIG. 3 may be improved to avoid storing the same information or repeating the same propagation at multiple nodes. For example, some basic optimizations can be implemented, such as delaying the creation of a constraint store at a node until something is actually Asserted at that node.

Also, it may be more efficient to postpone step 310(E) until all (or a threshold number) of the pending Assert operations by the client have been processed through steps 310(A)-310 (D). This would avoid showing intermediate steps in the reduction of the domains of the variables outside the service encapsulating the constraint store.

In addition in some cases, one may choose to simply inactivate the constraints containing main variables corresponding to parameter-aspect terms for which no Request nor Assert was invoked by the client, and activate them only upon such invocation. This may result in a loss of some of the propagations, which might still be acceptable in some situations (for example, because many constraint solvers for finite domains working by arc-consistency compute an upper bound of the real set of possible values for a variable, this item only loosens this upper bound).

Further, some constraint solvers allow the specification of "ask" clauses in their constraints, with the effect of delaying a constraint till another constraint is entailed. Clearly, if the entailment of an ask clause is achieved at one node, so is it at all the descendent nodes, and therefore, the ask clause can immediately be removed at these nodes.

Finally, although embodiments described herein have been for finite-domain constraint solvers, it will be appreciated that the present invention also applies to other types of constraint solvers (e.g., linear integer programming techniques such as simplex, or even polynomial and other non-linear methods), as long as: (a) it is possible to turn external statements on parameter-aspect pairs used in the negotiation into unary constraints understood by the constraint solver on the main variables (at steps 310(A)-310(B)); and (b) it is possible to detect modifications of the internal knowledge derived by the constraint solver on a variable (at step 310(C)) and turn them into statements on parameter-aspect pairs (at step 310(E)).

An additional extension of the method shown in FIG. 3 consists in introducing a back-propagation mechanism directly related to the structure of the negotiation graph. This is only possible when the server can acquire the guarantee that a black node (i.e., decision point) is "closed" (i.e., no new alternative (decided by the client) will arise in the future from that node). In the event such a guarantee can be obtained, the constraints at the offsprings of that node can then be back-propagated to n by generalization.

For example, suppose that a closed black node n has two, offsprings $n_1$, $n_2$, and that the domain of a variable s is reduced to {1 . . . 10} at node n, {3 . . . 6} at node $n_1$ and {4 . . . 8} at node $n_2$. Then the domain at node n can be further reduced by intersecting it with the union of the domains at node $n_1$ and $n_2$ (or some superset approximation of this union). In this example, that would mean that the domain at node n could be reduced to {3 . . . 8}. Such back-propagations need to take place once when the server detects that a black node is closed, and then, each time an Assert operation is invoked at an offspring of that node. While the mechanism by which a server can be convinced that the client will not open any new alternative from a given decision point are not discussed, it will be appreciated that the server may rely on an additional operation added to the negotiation protocol that enables it to do so.

C. Detailed Print Shop Example

Figure 5:
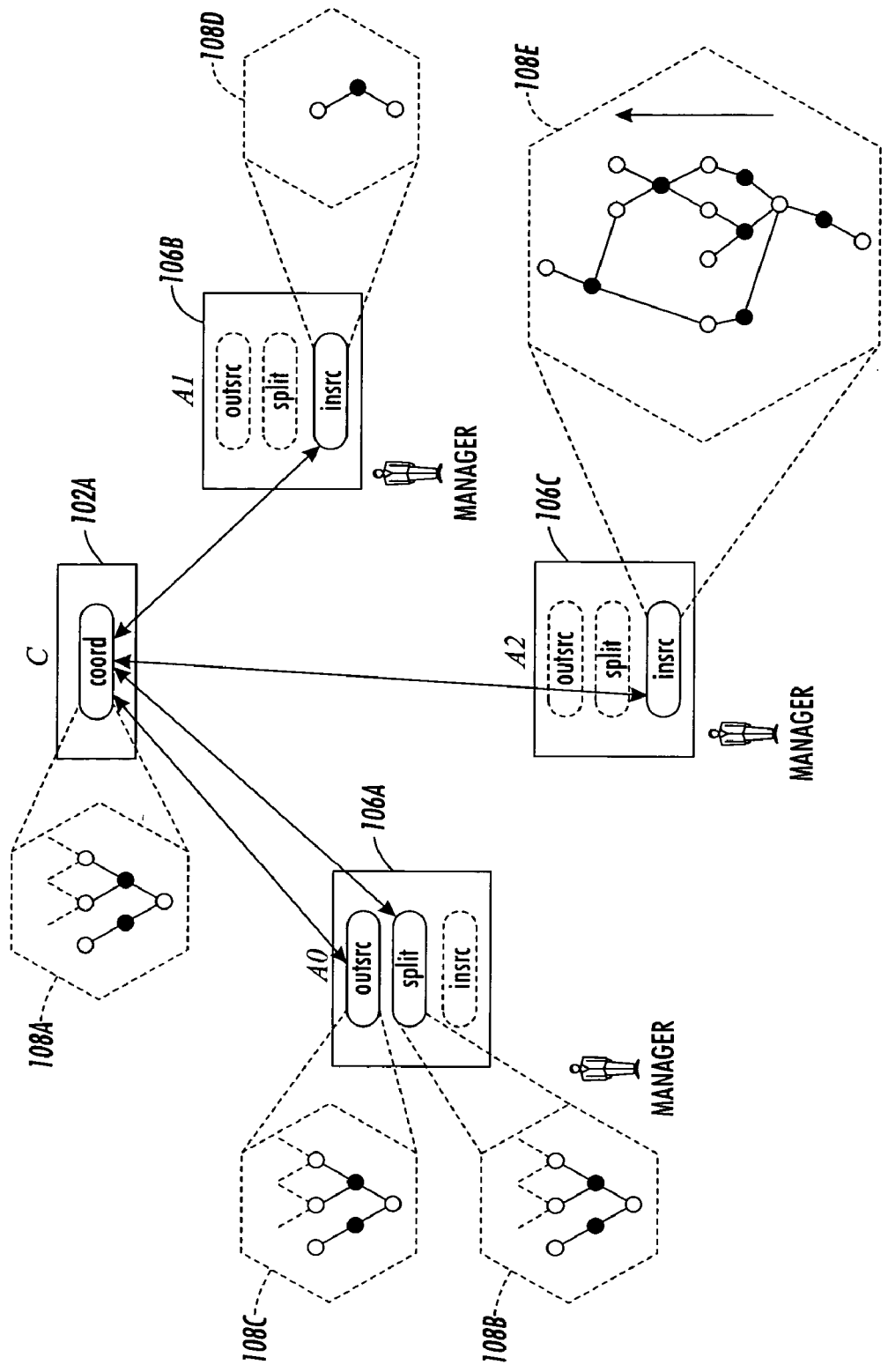
FIG. 5 illustrates an example negotiation using graphs involving a component with a service that encapsulates a constraint solver.

FIG. 5 illustrates an example negotiation using graphs involving a component with a service that encapsulates a constraint solver in accordance with the present invention. In this example negotiation, there exist four components C, $A_0$, $A_1$, and $A_2$. Component C is a coordinator and offers a single service coord(no parameter) which coordinates the negotiation between components $A_0$, $A_1$, and $A_2$ which are three print shops (or more generally participants). The coordinator may operate either separate from or co-located with the other components. As shown in FIG. 5, each print shop component 106 offers the following three services: (1) outsrc(job), which allows a print shop to negotiate the outsourcing of a print job named "job"; (2) insrc(job), which allows a print shop to negotiate the insourcing of a print job named "job"; and (3) split(job,job1,job2), which allows a print shop to negotiate the splitting of a print job named "job" into two sub-jobs (or parts) named "job1".

The behavior of the insrc(job) service of a print shop is unconstrained. In its simplest form, it could be implemented as a graphical user interface that allows a human decision-maker, typically the print shop manager, to directly send and receive negotiation decisions about job as discussed in more detail below. The behavior of the outsrc(job) service of a print shop, which in the example shown in FIG. 5 is $A_0$, consists in initiating and then coordinating several one-to-one negotiations with potential partners for the outsourcing. When invoked, $A_0$ executes the three actions set forth in Table 2.

Note in FIG. 5 only those services with solid lines are active (or invoked) and those with dotted lines are not active (or not invoked).

TABLE 2

| ACTION | DESCRIPTION |
|---|---|
| Action 1: | $A_0$ invokes the split(job, job1, job2) service of $A_0$ itself, for data-items job1, job2, so as to split its original job into two parts. |
| Action 2: | $A_0$ then determines two print shops, say $A_1$ and $A_2$, and invokes services insrc(job1) in $A_1$ and insrc(job2) in $A_2$, thereby enforcing that each of them gets one part of the job. |
| Action 3: | $A_0$ coordinates the three negotiations thus engaged at actions 1 and 2: the negotiation engaged at action 1 tends to determine how the job should be split while the other two engaged at action 2 tend to fix the conditions (e.g., price) for the two sub-jobs. |

In another embodiment (at action 1 in Table 2), the service split( ) could be merged with service outsrc( ) since they belong to the same component and the former is always invoked only by the latter. However, it will be appreciated that separating service split( ) from outsrc( ) tends to allow the behavior of the services to be specified and maintained separately, using constraints, in a more direct and simplified way as shown below. In addition at action 2 in Table 2, it is not described herein how $A_1$ and $A_2$ are chosen. However, several alternatives could be concurrently explored to make that choice. Also at action 3 in Table 2, the interdependency between the negotiations, and hence the need for their coordination, comes from their sharing some negotiation objects, namely job1 and job2. When a consensus is reached in all three negotiations, the outsrc( ) service instance is therefore ready to make an offer to its own invoker. It will be appreciated by those skilled in the art that in carrying out the negotiation, alternative strategies for the outsrc( ) service may be considered as well before making a decision.

C.1 Human Controlled Services

More specifically, in the example shown in FIG. 5 and for simplicity only, the services outsrc(job) and insrc(job) are assumed to be directly controlled by a human user (such as the print shop manager) through an interface (possibly enriched with software assistants) that allows the human users to take part in negotiations by invoking the primitives of the Xplore negotiation framework.

In particular, at the creation of an instance of service outsrc (job) or insrc(job) at a node n on a negotiation graph, a Request( ) is invoked at node n on the size and date aspects of its parameter job. This means that, at the beginning, the human user is ready to negotiate on the size and date issues of the print jobs that are sought to be insourced or outsourced (more issues may be entered later in the negotiation, using similar Requests( )). In this example, it is assumed the human users invoke at least the following primitives: outsrc.Request (n, job.size, job.date) and insrc.Request(n, job.size, job.date).

C.2 Constraint Based Service

Further in this example, the service split(job,job1,job2) of a print shop is implemented as a service with a constraint solver embedded therein, as shown in FIG. 1. Its semantics may be informally described by the following three constraints: (1) job.size=job1.size+job2.size; (2) job1.date<=job.date; and (3) job2.date<=job.date. When aspect-variable mapping takes place, the parameter-aspect pairs job.size, job1.size, job2.size, job.date, job1.date, job2.date are mapped onto main variables s, $s_1$, $s_2$, d, $d_1$, $d_2$ of the constraint solver and the following three semantic constraints are installed in the constraint solver: (1) $s=s_1+s_2$; (2) $d_1 \leq d$; and (3) $d_2 \leq d$. It is assumed that all of variables of the constraint solver have a finite reference domain, such as, the domain $\{1 \ldots 100\}$ for the constraint variables s, $s_1$, $s_2$ (corresponding to sizes) or the domain $\{1 \ldots 15\}$ for the constraint variables d, $d_1$, $d_2$ (corresponding to dates). Furthermore, whenever a service instance of split is created at a node n on the negotiation graph, the following two Requests are invoked: (1) split.Request(n, {job.size, job1.size, job2.size}); and (2) split.Request(n, {job.date, job1.date, job2.date}).

C.3 Coordination: From Multi-Party To Two-Party Negotiations

In addition, consider, for example, a sample negotiation in which print shop $A_0$ wants to outsource a job in two parts, one to be negotiated with print shop $A_1$ and the other to be negotiated with print shop $A_2$. Other negotiation schemes of this kind may be occurring concurrently. The goal of the negotiation, which will be enacted by the coordinator C, can be informally captured by the negotiation problem statement defined as follows: $A_0$:outsrc(job=J) @ $A_0$:split(job=J, job1=J1,job2=J2) @ $A_1$:insrc(job=J1) @ $A_2$:insrc(job=J2)

The negotiation problem statement above describes the agreement that should be obtained as a result of the negotiation process among the participants coordinated by the coordinator C, in which print shop $A_0$ outsources a print job J in two parts J1 and J2, which are insourced by print shops $A_1$ and $A_2$, respectively. Note that the names of the negotiated data-items are different for the different components. For example, J1 in C:coord is job in $A_1$:insrc and does not even appear in $A_2$:insrc. The synchronization mechanism of the Xplore negotiation framework manages (and exploits) such name dependencies. More specifically as described in the Xplore negotiation framework, the coordinator C invokes operations of the Xplore negotiation framework at the node n in its negotiation graph to initialize it, as follows:

$A_0$:outsrc.Connect(n,[job=J])
$A_0$:split.Connect(n,[job=J,job1 =J1,job2=J2])
$A_1$:insrc.Connect(n,[job=J1])
$A_2$:insrc.Connect(n,[job=J2])

Once initialization is completed, the synchronization mechanism of the Xplore negotiation framework may be used to carry out a multi-party negotiation by reducing it to a set of two-party negotiations in which the coordinator C plays the role of a client and each of the other components plays the role of a server, as shown in FIG. 1. The dependencies between these sub-negotiations are simply achieved by parameter sharing (e.g., J1 is shared between the negotiation with $A_1$:insrc and that with $A_0$:split). In each negotiation with one participant, the coordinator simply acts as a proxy for all the other participants (i.e., the copycat strategy).

For example in the table shown in FIG. 6, the Requests (on the size aspect) initiated by each participant are immediately reflected onto (the negotiation graphs of) the other participants sharing the same parameter. Later in the synchronization, an Assert at a node n of a negotiation graph is synchronized only when a matching Request can be found at a node n' that is related to n (i.e., if creating a node merging both n, n' is not disallowed). More precisely, the Assert is reflected in the service instances originating such Requests. Finally, Open invocations are synchronized only when needed to create the nodes (and their ancestry) on which Asserts and Requests are invoked, as more fully described in the Xplore negotiation framework.

C.4 Example Of Constraint Propagation At A Node

Figure 7:
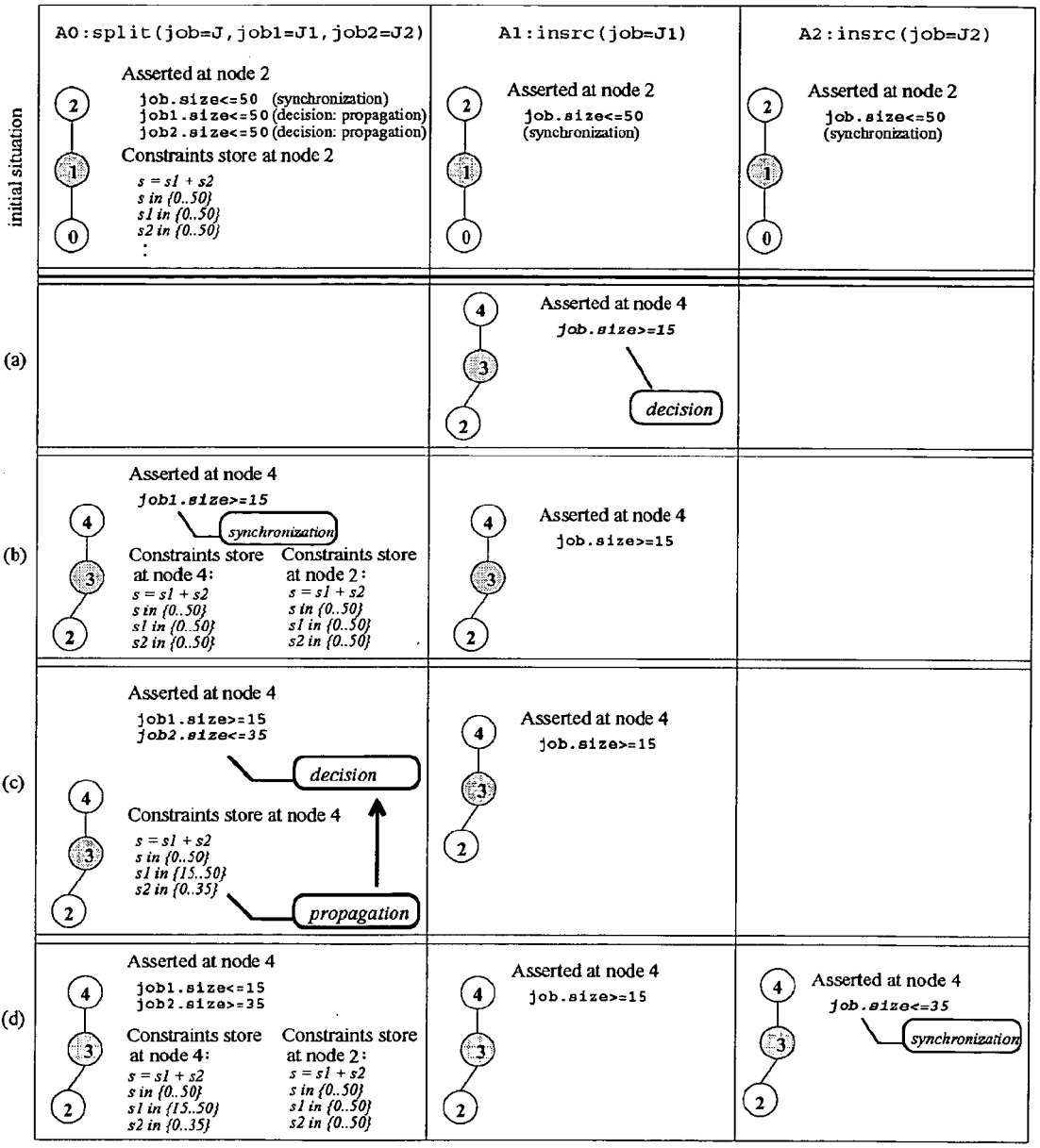
FIG. 7 illustrates an example of constraint propagation at a node in a negotiation graph.

FIG. 7 illustrates an example of constraint propagation at a node in a negotiation graph for the service instances $A_0$:split, $A_1$:insrc and $A_2$:insrc (but not for $A_0$:outsrc nor C:coord). In this example, print shop $A_0$ seeks to outsource a part of a large job of size 50, although it is not sure yet how much of the job it is ready to perform locally and how much it wishes to outsource, nor how to split the outsourced part between $A_1$ and $A_2$. Consequently, $A_0$ Opens in its negotiation graph (shown on the left side of the first column in FIG. 7) a black node 1 (a decision point) and a white node 2 (a negotiation context) and Asserts job.size<=50 at node 2 in $A_0$:outsrc, where job denotes the part it wishes to outsource. Other offsprings to node 1 can be added later for other outsourcing offers. As a consequence of synchronization and constraint propagation in $A_0$:split, the size of the two parts of the outsourced job are also constrained (i.e., job1.size<=50, job2.size<=50). These events are shown in column 1 ($A_0$:split) and row 1 (initial situation) of FIG. 7.

Figure 8:
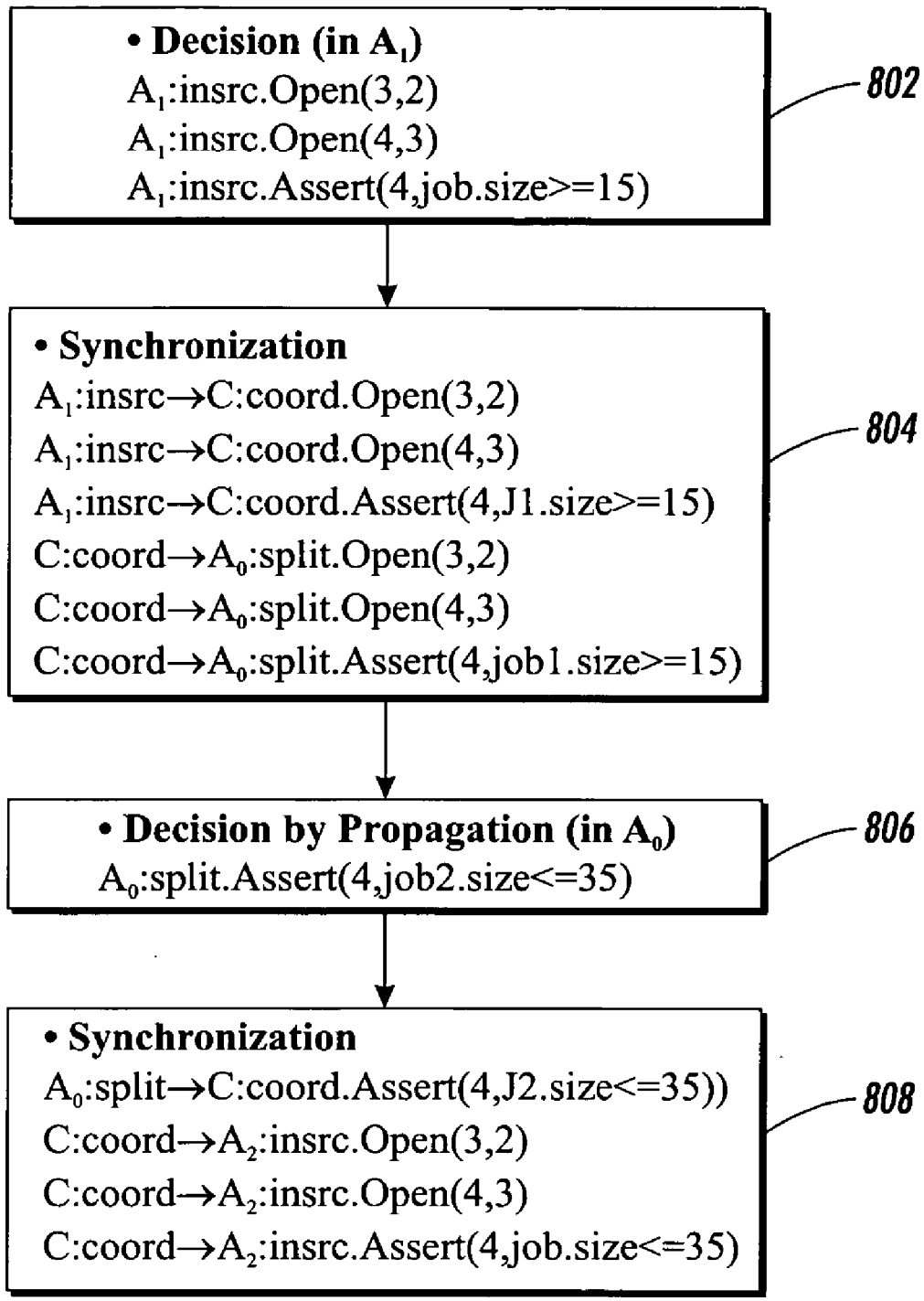
FIG. 8 sets forth a fragment of conversation among three print shops through a coordinator for the example illustrated in FIG. 7.

FIG. 8 sets forth a fragment of conversation among the three print shops through the coordinator. The fragment corresponds to a phase of the negotiation where print shop $A_1$ makes a proposal on the size of its job (i.e., the first part of the global job). The proposal, which is an internal decision on job in $A_1$:insrc, is reflected on job1 in $A_0$:split, where it triggers a constraint propagation and a new decision on job2, which is finally reflected on job in $A_2$:insrc. This illustrates a mixed process that possibly involves human controlled decisions in $A_1$ and automatically computed (constraint based) decisions in $A_0$, resulting in an effect in $A_2$ where it may trigger another human controlled decision (e.g., a counter-proposal, or a refinement).

At 802, the service instance $A_1$:insrc creates a decision point (black node 3) from node 2 with one alternative (white node 4; others may come later). It then constrains the size of its job (which is the first part of the outsourced job) in this alternative by Asserting job.size>=15. These events are shown in row (a) of FIG. 7.

At 804, the synchronization infrastructure mirrors the Assert of job.size>=15 at node 4 in $A_1$:insrc as J1.size>=15 in C:coord then as job1.size>=15 in $A_0$:split (note that this happens only because $A_0$:split previously made a Request on job1.size which was reflected in $A_1$:insrc). These events are shown in row (b) of FIG. 7.

At 806, a consequence of the Assert of job1.size>=15 at node 4 in $A_0$:split, the corresponding main variable s1 in the constraint solver is constrained to be greater or equal to 15 ($s_1 \in \{15 \ldots 50\}$). This triggers a constraint propagation by arc-consistency on $s_1+s_2=s$ at node 4, resulting in the modification of the domain of the main variable corresponding to job2.size ($s_2 \in \{0 \ldots 35\}$). Such a modification in turn generates a new Assert of job2.size<=35, still at node 4. These events are shown in row (c) of FIG. 7.

At 808, the synchronization infrastructure mirrors the Assert of job2.size<=35 at node 4 in A0:split as J2.size<=35 in C:Coord then as job.size<=35, still at node 4 in A2:insrc which had Requested job.size. These events are shown in row (d) of FIG. 7.

C.5 Example of Recursive Forward Propagation

Figure 9:
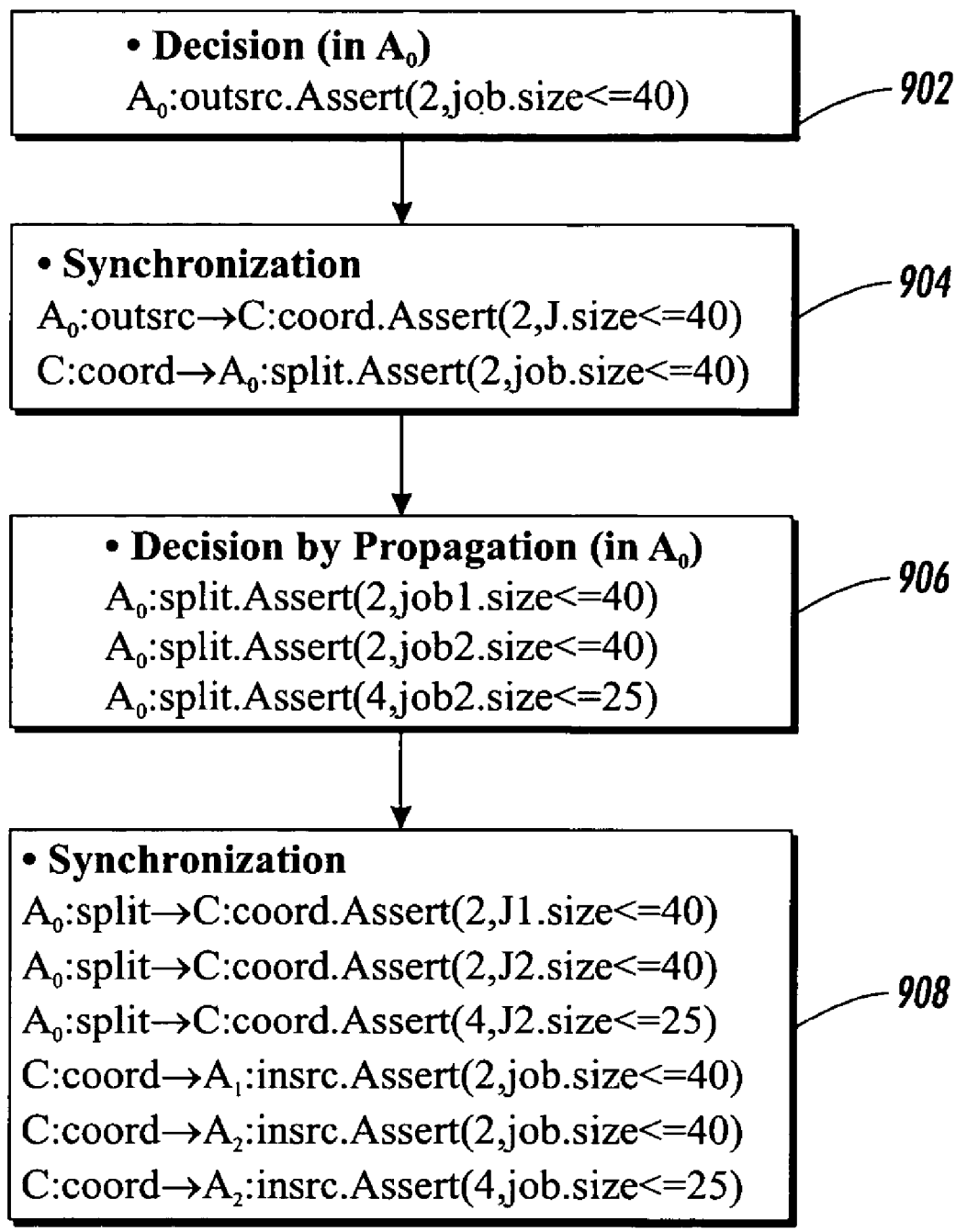
FIG. 9 sets forth a fragment of conversation among three print shops through a coordinator that illustrates an example of recursive forward propagation.

FIG. 9 sets forth a fragment of conversation where at some point, $A_0$ manages to allocate locally a chunk of size 10 of the global job, so that what remains at most for outsource is of size 40. This internal decision on job in $A_0$:outsrc at node 2 (which is the only visible node in that service instance) is reflected on job in $A_0$:split where it triggers two different propagations concerning both job1 and job2 at node 2 and at node 4 (in fact at all the descendents of node 2). These decisions are in turn reflected back on job in $A_1$:insrc and $A_2$:insrc at these nodes.

At 902, without even seeing the previous expansion of node 2, $A_0$:outsrc constrains the size of its job at that node by Asserting job.size<=40.

At 904, the synchronization infrastructure mirrors the Assert of job.size<=40 to those who Requested it.

At 906, as a consequence of the Assert of job.size<=40 at node 2 in $A_0$:split, the corresponding main variable s in the constraint solver is constrained to be lower or equal to 40 ($s \in \{0 \ldots 40\}$). This triggers a constraint propagation by arc-consistency on $s_1+s_2=s$ at node 2, resulting in the modification of the domain of the main variables corresponding to job1.size and job2.size ($s_1, \in \{0 \ldots 40\}$ and $s_2 \in \{0 \ldots 40\}$). Such a modification in turn generates new Asserts of job1.size<=40 and job2.size<=40, still at node 2. Furthermore, the domain modifications are reported at node 4, where there now exists $s \in \{0 \ldots 40\}$, $s_1 \in \{15 \ldots 40\}$, $s_2 \in \{0 \ldots 35\}$. But this triggers further propagations at node 4, still by arc-consistency on $s_1+s_2=s$, leading to $s_2 \in \{0 \ldots 25\}$. Hence job2.size<=25 is Asserted at node 4 (thereby illustrating recursive forward propagation).

At 908, the synchronization infrastructure mirrors the Asserts to those participants who Requested them.

D. Miscellaneous

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments of the invention. As such, alternative ordering of the steps, performing one or more steps in parallel, and/or performing additional or fewer steps may be done in alternative embodiments of the invention.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A computer-based method for carrying out a negotiation concerning set of actions to execute a print job performed by selected ones of a plurality of participants, wherein at least one of the plurality of participants encapsulates a constraint solver in a service, comprising:

defining processing instructions in a memory of the system for carrying out the negotiation using the service encapsulating the constraint solver to facilitate printing via a processor; and executing the processing instructions, via the processor, to carry out the negotiation with the service encapsulating the constraint solver; wherein said executing the processing instructions for carrying out the negotiation with the service encapsulating the constraint solver further comprises:

(A) establishing encapsulation input in the memory that includes: (a) a mapping between one or more of a price, a size, and a delivery date of print-job parameters of the service and corresponding variables of the constraint solver, (b) a translation between negotiation statements on the one or more of a price, a size, and a delivery date of the print-job parameters of the service and domain constraints imposed on the corresponding variables of the constraint solver, and (c) a set of semantic constraints of the service on variables of the constraint solver;

(B) constructing a graph in the memory for negotiating the set of actions to be performed, wherein each action corresponds to one or more invocation patterns, each node of the graph defining a negotiation context that has associated therewith a constraint store with at least a set of domain constraints stored therein;

(C) propagating constraints defined by the set of semantic constraints and the set of domain constraints associated with nodes of the graph to other participants in the negotiation as domain constraints augment the set of semantic constraints during the negotiation utilizing a protocol defined by one or more primitives that are instantiated by the one or more invocation patterns; and (D) executing one or more actions based at least in part upon the interdependencies between the one or more invocation patterns, the one or more actions facilitate printing of at least one print job, each print job creates at least one hard copy document based at least in part upon the processing instructions.

2. The method according to claim 1, wherein the processing instructions are stored in memory of the system and are executed by one or more processors of the system.

3. The method according to claim 1, where the negotiation is defined by a negotiation problem statement.

4. The method according to claim 1, wherein the set of domain constraints are first propagated across each constraint store of the graph before propagating the set of domain constraints to other participants of the negotiation.

5. The method according to claim 4, wherein the set of domain constraints are first propagated within each constraint store of the graph before propagating the set of domain constraints across each constraint store of the graph.

6. The method according to claim 1, wherein the set of domain constraints are first propagated within each constraint store of the graph before propagating the set of domain constraints to other participants of the negotiation.

7. A system having a processor for carrying out a negotiation concerning a set of actions for executing a print-job to be performed by selected ones of a plurality of participants, the negotiation being carried out with at least one of the plurality of participants encapsulating a constraint solver in a service, comprising:
   a memory for storing processing instructions for carrying out the negotiation using the service encapsulating the constraint solver to facilitate printing; and
   a processor for executing the processing instructions for carrying out the negotiation using the service encapsulating the constraint solver; the processor in executing the processing instructions for carrying out the negotiation using the service encapsulating the constraint solver:
   (A) establishing encapsulation input in the memory: (a) a mapping between one or more of a price, a size, and a delivery date of the print-job parameters of the service and corresponding variables of the constraint solver of parameters of the service and corresponding variables of the constraint solver, (b) a translation between negotiation statements on the one or more of a price, a size, and a delivery date of the print-job parameters of the service and domain constraints imposed on the corresponding variables of the constraint solver, and (c) a set of semantic constraints of the service on variables of the constraint solver;
   (B) constructing a graph in the memory for negotiating the set of actions to be performed, wherein each action corresponds to one or more invocation patterns, each node of the graph defining a negotiation context that has associated therewith a constraint store with at least a set of domain constraints stored therein;
   (C) propagating constraints defined by the set of semantic constraints and the set of domain constraints associated with nodes of the graph to other participants in the negotiation as domain constraints augment the set of semantic constraints during the negotiation utilizing a protocol defined by one or more primitives that are instantiated by the one or more invocation patterns; and
   (D) executing one or more actions based at least in part upon the interdependencies between the one or more invocation patterns, the one or more actions facilitate printing of at least one print job, each print job creates at least one hard copy document based at least in part upon the processing instructions.

8. The system according to claim 7, further comprising one or more additional processors for executing the processing instructions to carry out the negotiation.

9. The system according to claim 7, where the negotiation is defined by a negotiation problem statement.

10. The system according to claim 7, wherein the set of domain constraints are first propagated across each constraint store of the graph before propagating the set of domain constraints to other participants of the negotiation.

11. The system according to claim 10, wherein the set of domain constraints are first propagated within each constraint store of the graph before propagating the set of domain constraints across each constraint store of the graph.

12. The system according to claim 7, wherein the set of domain constraints are first propagated within each constraint store of the graph before propagating the set of domain constraints to other participants of the negotiation.

13. An article of manufacture for use in a machine comprising:
   a memory;
   processing instructions stored in the memory for carrying out a negotiation concerning a set of actions for executing a print-job to be performed by selected ones of a plurality of participants, the negotiation being carried out with at least one of the plurality of participants encapsulating a constraint solver in a service; wherein the processing instructions in carrying out the negotiation with at least one of the plurality of participants encapsulating a constraint solver in a service:
   defining processing instructions in a memory of the system for carrying out the negotiation using the service encapsulating the constraint solver to facilitate printing; and
   executing the processing instructions with the processor for carrying out the negotiation with the service encapsulating the constraint solver; the processor in executing the processing instructions for carrying out the negotiation with the service encapsulating the constraint solver:
   (A) establishing encapsulation input in the memory: (a) a mapping between one or more of a price, a size, and a delivery date of print-job parameters of the service and corresponding variables of the constraint solver, (b) a translation between negotiation statements on the one or more of a price, a size, and a delivery date of print-job of the print-job parameters of the service and domain constraints imposed on the corresponding variables of the constraint solver, and (c) a set of semantic constraints of the service on variables of the constraint solver;
   (B) constructing a graph in the memory for negotiating the set of actions to be performed, wherein each action corresponds to one or more invocation patterns, each node of the graph defining a negotiation context that has associated therewith a constraint store with at least a set of domain constraints stored therein;
   (C) propagating constraints defined by the set of semantic constraints and the set of domain constraints associated with nodes of the graph to other participants in the negotiation as domain constraints augment the set of semantic constraints during the negotiation utilizing a protocol defined by one or more primitives that are instantiated by the one or more invocation patterns; and
   (D) executing one or more actions based at least in part upon the interdependencies between the one or more invocation patterns, the one or more actions facilitate printing of at least one print job, each print job creates at least one hard copy document based at least in part upon the processing instructions.

14. The article of manufacture according to claim 13, wherein the set of domain constraints are first propagated across each constraint store of the graph before propagating the set of domain constraints to other participants of the negotiation.

15. The article of manufacture according to claim 14, wherein the set of domain constraints are first propagated within each constraint store of the graph before propagating the set of domain constraints across each constraint store of the graph.

16. The article of manufacture according to claim 13, wherein the set of domain constraints are first propagated within each constraint store of the graph before propagating the set of domain constraints to other participants of the negotiation.

* * * * *

UNITED STATES PATENT AND TRADEMARK OFFICE
CERTIFICATE OF CORRECTION

| | | |
|---|---|---|
| PATENT NO. | : 7,647,212 B2 | Page 1 of 1 |
| APPLICATION NO. | : 10/855515 | |
| DATED | : January 12, 2010 | |
| INVENTOR(S) | : Jean-Marc Andreoli et al. | |

It is certified that error appears in the above-identified patent and that said Letters Patent is hereby corrected as shown below:

On the Title Page Item (73) Assignee should read: Xerox Corporation, Norwalk, CT (US)

Signed and Sealed this

Fifteenth Day of June, 2010

David J. Kappos
*Director of the United States Patent and Trademark Office*